United States Patent [19]

Nishiyama et al.

[11] Patent Number: 4,919,314
[45] Date of Patent: Apr. 24, 1990

[54] TIME CONTROL DEVICE FOR WATER CONDITIONING APPARATUS

[75] Inventors: Masanobu Nishiyama, Ehime; Hitoshi Abe; Yasuo Ochi, both of Matsuyama, all of Japan

[73] Assignee: Miura Co., Ltd, Matsuyama, Japan

[21] Appl. No.: 240,949

[22] Filed: Sep. 6, 1988

[30] Foreign Application Priority Data

Sep. 7, 1987 [JP] Japan ................. 62-224433

[51] Int. Cl.$^5$ ................................. G04C 5/08
[52] U.S. Cl. ................. 222/643; 137/624.13; 210/139
[58] Field of Search .......... 222/643, 638, 651, 644, 222/652, 190; 137/624.13, 624.15, 624.2, 625.29, 599.1; 210/139, 140

[56] References Cited

U.S. PATENT DOCUMENTS

| | | | |
|---|---|---|---|
| 2,967,546 | 1/1961 | Sisson | 137/624.2 |
| 3,053,268 | 9/1962 | Schulze et al. | 137/624.13 |
| 3,168,110 | 2/1965 | Reynolds | 137/624.13 |
| 3,487,854 | 1/1970 | Deheer et al. | 137/624.2 |
| 3,616,820 | 11/1971 | Fleckenstein | 137/624.13 |
| 4,290,451 | 9/1981 | Fleckenstein et al. | 137/624.13 |

FOREIGN PATENT DOCUMENTS

| | | |
|---|---|---|
| 48-44944 | 6/1973 | Japan . |
| 50-58050 | 5/1975 | Japan . |
| 52-43357 | 3/1977 | Japan . |
| 52-44240 | 3/1977 | Japan . |
| 57-156083 | 9/1982 | Japan . |

Primary Examiner—Joseph J. Rolla
Assistant Examiner—Kenneth Noland
Attorney, Agent, or Firm—Benasutti

[57] ABSTRACT

A time control device provided in a water conditioning apparatus, and including a control mechanism, a main shaft, a main wheel rotating about the axis of the main shaft at a constant speed, and a skipper wheel rotating about the axis of the main shaft and rotated by the main wheel through a predetermined angle. The control mechanism controls a flow of liquid in the apparatus in accordance with a rotation of the main shaft, to carry out a liquid treatment. A pin engageable with a projection cam formed on a housing is provided at the main wheel to rotate the skipper wheel through the predetermined angle, and a finger member is provided on the skipper wheel to transmit the predetermined angle rotation to the main shaft, so that the main shaft drives the control mechanism to control the flow.

18 Claims, 14 Drawing Sheets

TIME CONTROL DEVICE FOR WATER CONDITIONING APPARATUS

BACKGROUND OF THE INVENTION

1. Field of the Invention

The present invention relates to a water conditioning apparatus, such as a water softening unit, a filter removing foreign matter from water, a purified water system, and the like, the apparatus being provided with a time control device for controlling a process thereof.

2. Description of the Related Art

A conventional time control device is disclosed in Japanese Unexamined Patent Publication No. 57-156083. In this device, a day-wheel (a main wheel) is driven by a motor to rotate about a first axis at a constant speed, for example, one revolution per day, and a skipper wheel is provided to rotate about a second axis different from the first axis. The day-wheel engages a claw portion formed on the skipper wheel at a predetermined angular position, to rotate the skipper wheel through a predetermined angle, so that a drive mechanism is driven, and accordingly, a regenerating operation is carried out to regenerate an ion exchange resin.

As described above, since the day-wheel and the skipper wheel are located on different axes, it is difficult to reduce the size of the time control device and thus the water softening unit, per se, is large. On the other hand, if the sizes of the day-wheel and the skipper wheel are reduced, a finger member for setting a regeneration timing also must be reduced, and thus the operation of setting the timing becomes difficult.

SUMMARY OF THE INVENTION

Therefore, an object of the present invention is to provide a time control device having a reduced size, and easily operated.

According to the present invention, there is provided a time control device for a water conditioning apparatus, the time control device periodically changing flow conditions of a liquid in the apparatus. The time control device comprises a housing, a control means, a main shaft, a main wheel, a rotating means, a skipper wheel, an engaging means, and a transmitting means.

The housing is connected to a treatment container, and the control means controls a flow of the liquid in the water conditioning apparatus. The main shaft is rotatably supported by the housing, and is provided with a mechanism for driving the control means in accordance with a rotation of the main shaft. The main wheel is rotatably supported about the axis of the main shaft, and the rotating means is provided to rotate the main shaft and the main wheel. Namely, the rotating means constantly rotates the main wheel at a predetermined speed, and thus the main shaft is rotated to conduct a treatment. The skipper wheel is also rotatably supported about the axis of the main shaft, and the engaging means is provided to engage the main wheel and the skipper wheel, to cause the skipper wheel to rotate through a predetermined angle. The transmitting means transmits the predetermined angular rotation of the skipper wheel to the main shaft, and thus the main shaft is rotated directly by the rotating means, and accordingly, the treatment by and of the liquid is carried out.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

The present invention will now be described with reference to an embodiment shown in the attached drawings.

Figure 1:
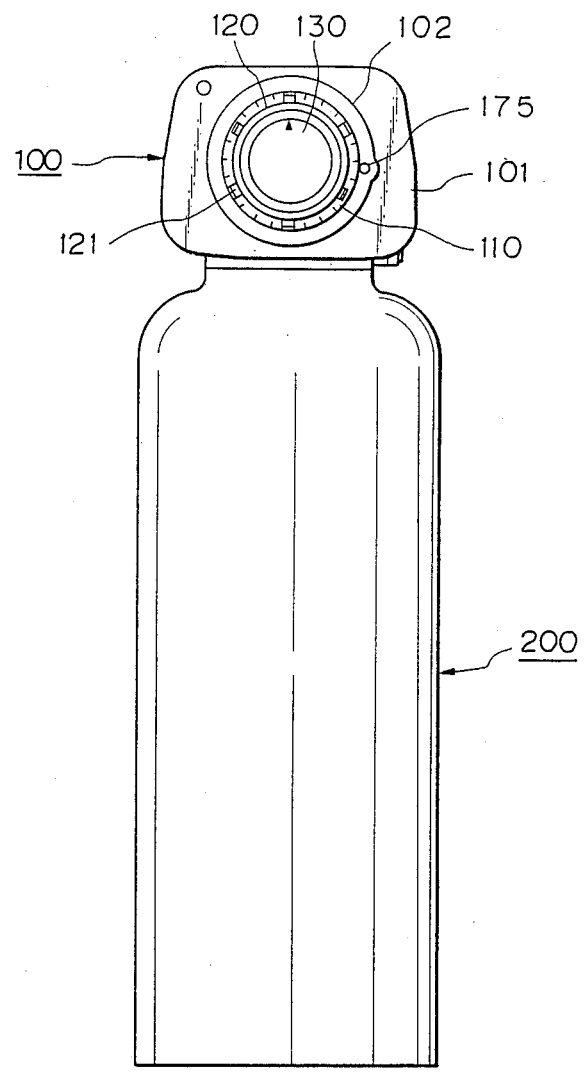
FIG. 1 is a side view of a water softening unit including a time control device of an embodiment of the present invention.
Figure 2:
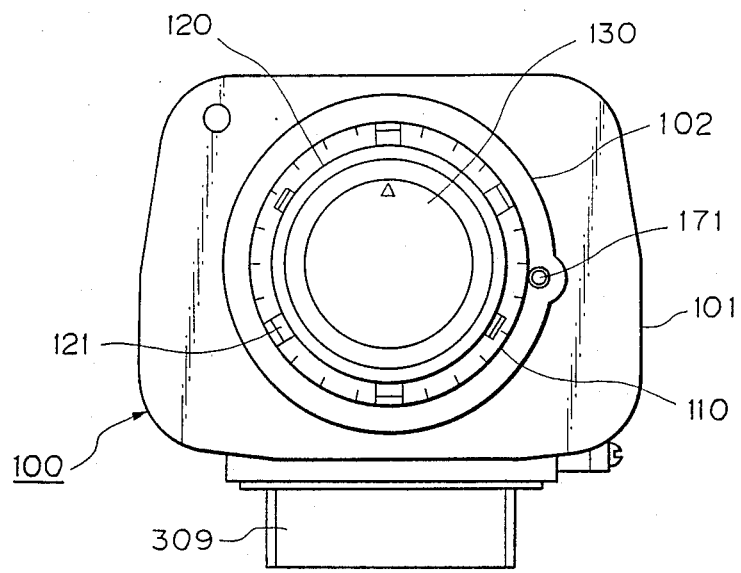
FIG. 2 is a front view of the time control device.

FIG. 1 shows an external appearance of a water softening unit In the drawing, a time control device 100 is mounted at the top portion of a cylindrical treatment container 200. The time control device 100 controls a timing of a regenerating of an ion exchange resin contained in the treatment container 200. As described later, hard water to be softened is supplied to the water softening unit and is made to flow through the ion exchange resin, so that softened water is discharged from the water softening unit. The time control device 100 periodically causes brine to flow through the ion exchange resin for regeneration, and after the regeneration, supplies water to the water softening unit, for rinsing the unit.

A main housing 101 of the time control device 100 is threadingly fixed to the top portion of the treatment container 200, and a time control mechanism and a valve mechanism are housed in the housing 101; a cylindrical timer housing 102 is integrally formed on a front face of the main housing 101 and a day-wheel 110 is arranged in the timer housing 102 to rotate about the axis thereof; and a skipper wheel 120 is mounted externally on the day-wheel 110, and a timer knob 130 is mounted externally on the skipper wheel 120. The day-wheel 110, skipper wheel 120, and timer knob 130 are coaxially rotatable.

FIGS. 2 through 7 show the time control device 100 in detail.

The main housing 101 is connected to the treatment container 200 through a cylindrical mouth 309 formed in a valve housing 300 housed in the main housing 101. Hard water is introduced into the housing 101 through an inlet port 104 formed therein, and then the hardness of the water is reduced by the ion exchange resin held in the treatment container 200, i.e., the water is softened. The softened water is discharged from an outlet port 105 formed in the housing 101, and supplied to an external device connected thereto. Brine for regenerating the resin is led into the housing 101 through a brine mouth 106 connected to a brine tank (not shown), and is discharged outside the unit through a drain port 107 formed in the housing 101. A time at which the regeneration should be conducted is set by a finger member 121 provided on the skipper wheel 120 and displacable along a radial direction thereof, as described later.

A main shaft 140 is extended in the main housing 101 and rotatably supported thereby. The main shaft 140 is provided with a gear 141, and three groove cams 142, 143, 144 on an outer surface thereof. Three arm members 152, 153, 154 are pivotally supported by a pivot pin 151; one end portion of the arm members 152, 153, 154 engaging with the groove cams 142, 143, 144, respectively, and the other end portion of the arm members 152, 153, 154 being connected to a main piston 162, a brine piston 163, and a drain piston 164, respectively. These pistons 162, 163, 164 move vertical to the main shaft 140 to open and close flow passages of the brine and water to be treated.

The main shaft 140 is rotated to move the arm members 152, 153, 154 in accordance with the groove cams 142, 143, 144, so that the main piston 162, the brine piston 163, and the drain piston 164 are displaced. As a result, as described later, a flow of hard water and brine in the water softening unit is controlled to carry out a regeneration of the ion exchange resin.

FIGS. 8 through 12 show the construction of the time control device in detail.

The day-wheel 110 is rotatably supported by a boss 102a located at the center of the housing 101, and is rotated about the boss 102a, i.e., the axis of the main shaft 140 by a rotating mechanism through a gear 111 formed on the outer surface of the day-wheel 110. The day-wheel 110 rotates at a predetermined constant speed, for example, one revolution per 24 hours.

An arcuate-shaped projection cam 102b is formed on the housing 101 and extends along the direction of rotation of the day-wheel 110 for, for example, about 60 degrees. A pin 112 is supported by and extends through the day-wheel 110 in parallel with the axis thereof, and a spring 113 is provided which urges the pin 112 toward the housing 101 so that a lower end portion 114 of the pin 112 engages with the surface of the housing 101, and therefore, with the projection cam 102b. When the pin 112 engages with the projection cam 102b, an upper end portion 115 of the pin 112 is made to project from the upper surface of the day-wheel 110.

The skipper wheel 120 is disposed coaxially with the day-wheel 110 and rotatably supported by the boss 102a, and finger members 121 are slidably supported in grooves 123 formed on the skipper wheel 120 and extendable radially thereof. Namely, the finger members 212 are radially displacable in the skipper wheel 120. The skipper wheel 120 faces the upper surface of the day-wheel 110, and a plurality of ribs 122 are formed to extend radially on a lower surface of the day-wheel 110. The number of ribs 122 corresponds to the number of finger members 121.

The lower end portion 114 of the pin 112 engages with the projection cam 102b, and accordingly, the upper end portion 115 is moved upward and engages with one of the ribs 122, whereby the skipper wheel 120 is rotated by the day-wheel 110 through a predetermined angle. The angle is determined by the circular length of the projection cam 102b.

Figure 9:
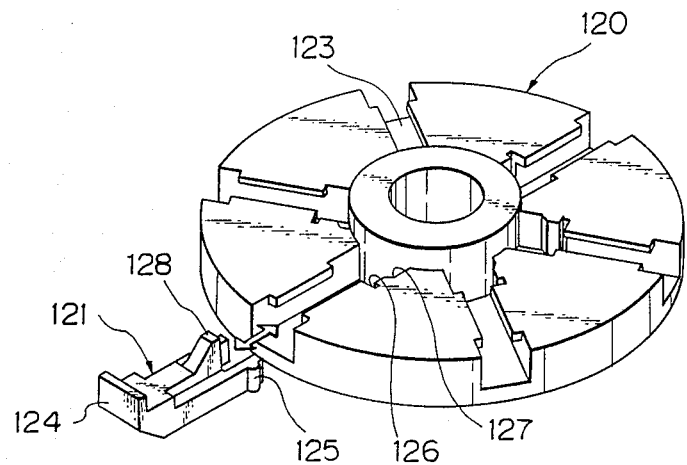
FIG. 9 is a perspective view of a skipper wheel.

FIG. 9 shows the skipper wheel 120 and a finger member 121. The finger member 121 has a hook portion 124 at the outer end thereof, to enable a manual setting of a time for a regeneration operation. The hook portion 124 projects from the outer periphery of the skipper wheel 120. The inner end of the finger member 121 is forked to provide a flexibility, and a protrusion 125, which can engage with first and second recesses 126, 127, is formed on the side face of the inner end of the finger member 121. The finger member 121 is also provided with a ridge 128 which can engage with a ratchet pole 131 (FIG. 8) attached to the timer knob 130.

When the protrusion 125 is engaged with the first recess 126 located at an outer position of the second recess 127, the ridge 128 is engaged with the ratchet pole 131 to rotate the timer knob, as described later, and when the protrusion 125 is engaged with the second recess 127, the ridge 128 is not engaged with the ratchet pole 131, and thus the rotation of the skipper wheel is not transmitted to the timer knob.

Figure 13:
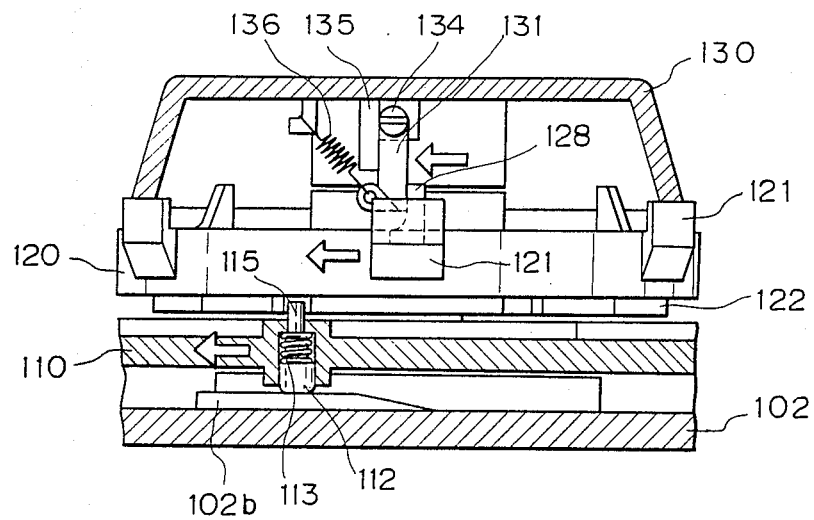
FIG. 13 is a sectional view of a day-wheel and the skipper wheel when a pin is engaged with a projection cam.
Figure 14:
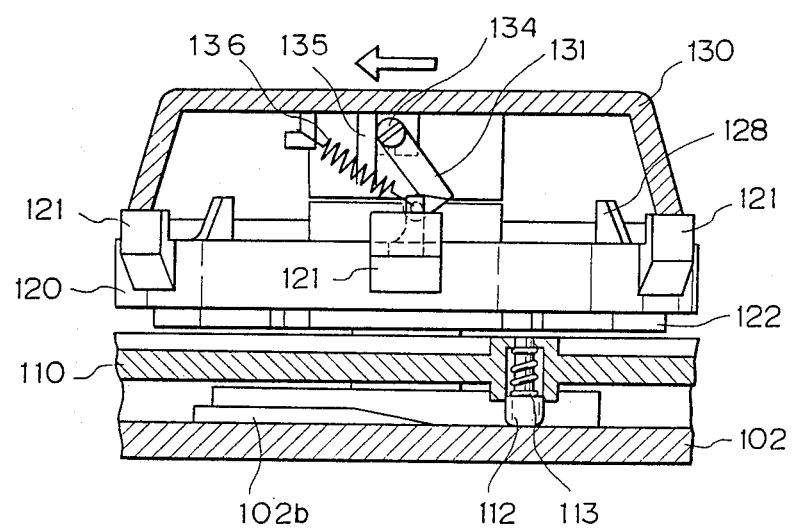
FIG. 14 is a sectional view of the day-wheel and the skipper wheel when the pin is not engaged with the projection cam.

The timer knob 130 is arranged coaxially with the skipper wheel 120 and fixed on the end portion 145 of the main shaft 140 by a screw 132. A support axis 134 is formed at the top portion of the ratchet pole 131, which is thus pivotably supported by a lower surface of the timer knob 130. As shown in FIGS. 13 and 14, the timer knob 130 is provided with a stopper 135 on a lower surface thereof and located in front of the timer knob 130 with respect to the ratchet pole 131. The timer knob 130 is provided with a spring 136 to pull the ratchet pole 131 toward the stopper.

Therefore, when the ridge 128 of the finger member 121 engages with and urges the ratchet pole 131 in a forward direction, the ratchet pole 131 comes into contact with the stopper 135, and therefore, is prevented from pivoting, and thus a rotation of the skipper wheel 120 is transmitted to the timer knob 130. This ratchet mechanism can be replaced by another mechanism providing a similar operation.

Figure 10:
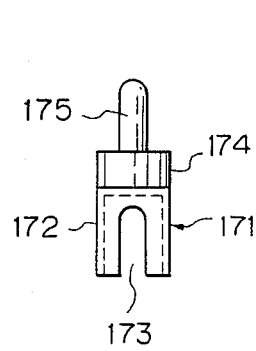
FIG. 10 is a side view of a pinion gear.

The day-wheel 110 is rotated at a constant speed by a pinion gear 171 provided near the day-wheel 110 and in mesh with the gear of the day-wheel 110. FIG. 10 shows the pinion gear 171, which is composed of a cylindrical portion 172 having notches 173, a gear portion 174, and a projecting pin 175.

Figure 11:
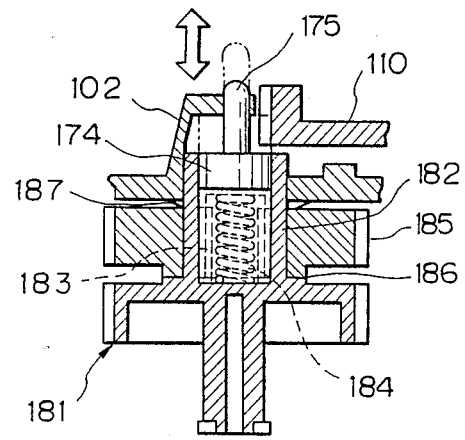
FIG. 11 is a sectional view of a drive gear and an idler gear.

FIG. 11 shows a construction in which the pinion gear 171 is assembled in a drive gear 181. The drive gear 181 has a cylindrical support portion 182 extending upward, and having an inner wall provided with claws 183. The cylindrical portion 172 of the pinion gear 171 is inserted in such a manner that the notches 173 engage with the claws 183, and a spring 184 is inserted between the cylindrical portion 172 and the bottom of the support portion 182 to urge the pinion gear 171 upward so that the gear portion 174 meshes with the gear of the day-wheel 110. When the projecting pin 175 is pushed downward to compress the spring 184, the gear portion 174 is released from the day-wheel 110, and thus the day-wheel can be rotated manually.

An idler gear 185 is rotatably fitted to the cylindrical support portion 182 and in mesh with the gear of the gear 141 of the main shaft 140 for a regenerating operation, as described later. A ratchet mechanism is provided as an engaging portion 186 between the drive gear 181 and the idler gear 185, so that the drive gear 181 and the idler gear 185 rotate as one body in one predetermined direction. A plate spring 187 is provided between the housing and the idler gear 185, to press the idler gear 185 against the drive gear 181.

Figure 3:
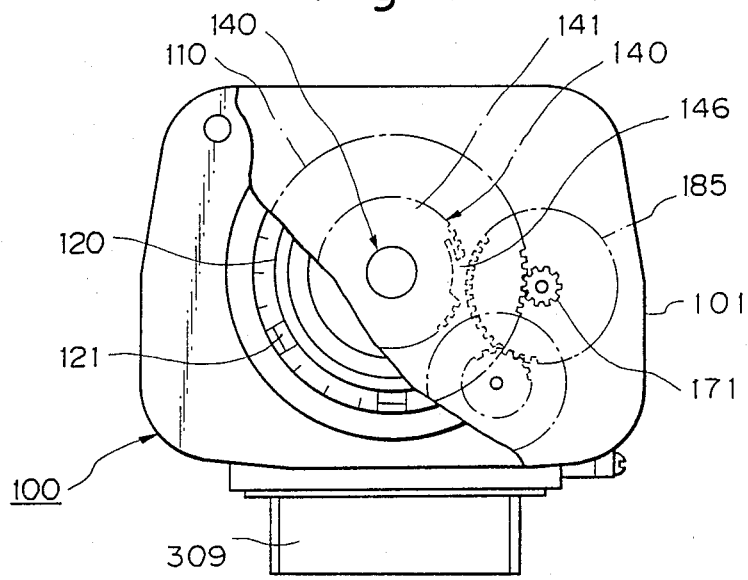
FIG. 3 is a view showing a gear mechanism of the time control device.
Figure 4:
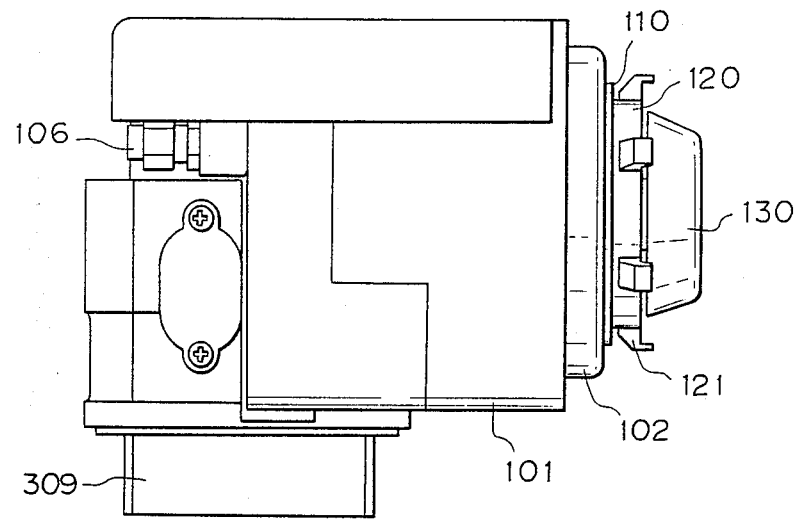
FIG. 4 is a side view of the time control device.

The gear 141 of the main shaft 140 has a notch portion 146 which does not mesh with the idler gear 185, and in a usual condition in which a softening cycle is carried out, as shown in FIG. 3, the notch portion 146 faces the idler gear 185, so that the gear 141 does not mesh with the idler gear 185. Therefore, the main shaft 140 is not rotated by a rotational force from a drive mechanism including the idler gear 185.

Figure 12:
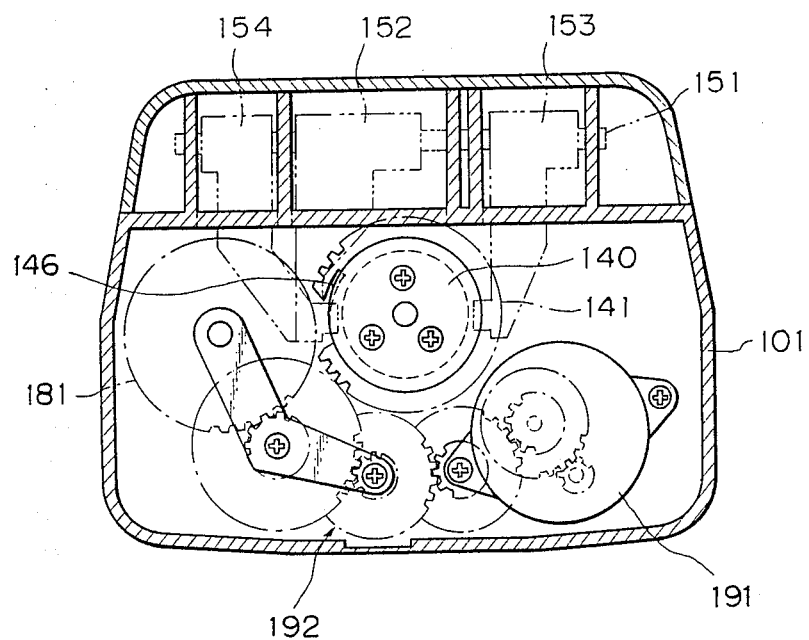
FIG. 12 is a sectional view of a housing, showing the gear mechanism.

FIG. 12 shows the drive mechanism for rotating the day-wheel 110 and the main shaft 140. A motor 191 is fixed to an inner wall of the housing 101, and an output shaft of the motor 191 is connected to a reduction gear train 192, which is connected to the drive gear 181. Therefore, the number of revolutions of the motor 191 is reduced by the gear train 192 to be transmitted to the drive gear 181.

Stopper balls 195, 196 are provided in holes formed in the housing 102 to adjust the positions of the day-wheel 110 and the gear 141 on the housing 102, respectively. These balls 195, 196 are urged by springs to engage recesses formed on the housing 102, whereby the positions of the day-wheel 110 and the gear 141 are adjusted to predetermined points after a regeneration operation.

An operation of the time control device 100 is described below.

Since the drive gear 181 is driven by the motor 191 to always rotate at a constant speed, the idler gear 185 engaging the drive gear 181 and the pinion gear 171 always rotates in the same direction as the drive gear 181 and at a constant speed. Due to the rotation of the pinion gear 171, the day-wheel 110 meshing with the pinion gear 171 rotates at a predetermined speed of, for example, one revolution per 24 hours, and since the gear 141 is not in mesh with the gear 185, due to the notch portion 146, the main shaft 140 is not rotated.

As shown in FIG. 13, when the day-wheel 110 rotates at a constant speed, the pin 112 provided in the day-wheel 110 is engaged with the projection cam 102b formed on the housing 102 at a predetermined section, so that the upper portion 115 of the pin 112 is moved upward. Namely, the upper portion 115 of the pin 112 is engaged with the rib 122, and thus the skipper wheel 120 is rotated through a predetermined angle corresponding to the length of the projection cam 102b.

If the finger member 121 is positioned at a first position in which the protrusion 125 is engaged with the first recess 126, the ridge 128 of the finger member 121 does not engage with the ratchet pole 131 while the day-wheel 110 rotates, so that the finger member 121 passes through the ratchet pole 131. Conversely, if the finger member 121 is positioned at a second position in which the protrusion 125 is engaged with the second recess 127, as shown in FIG. 13, the ridge 128 is engaged with the ratchet pole 131 when the day-wheel 110 is rotated, so that the timer knob 130 is rotated by the ratchet pole 131 through a predetermined angle corresponding to the length of the projection cam 102b, and as a result, the main shaft 140 is rotated through the same predetermined angle.

As described above, in a usual operation (a softening cycle), the notch portion 146 faces the idler gear 185 so that gears 141, 185 are not meshed and, therefore, the main shaft 140 is stationary. But, due to an engagement of the pin 112 and the projection cam 102b, the upper end portion 115 of the pin 112 is engaged with the rib 122 to rotate the skipper wheel 120 through a predetermined angle, so that the finger member 121 is engaged with the ratchet pole 131 to rotate the timer knob 130 through the same predetermined angle, and accordingly, the main shaft 140 is rotated so that the gear 141 comes into mesh with the idler gear 185, whereby the main shaft 140 is rotated by the gear 185.

When the main shaft 140 is rotated by the gear 185, the timer knob 130 is rotated together with the main shaft 140, so that the ratchet pole 131 comes into contact with the other finger members 121 which did not contribute to the rotation through the predetermined angle by the timer knob 130. But, as shown in FIG. 14, the ratchet pole 131 is pivoted backward against the force of the spring 136, to pass the finger members 121. This operation is the same as that of a usual ratchet mechanism.

When the main shaft 140 has rotated through one revolution, so that the notch portion 146 faces the gear 185, the gear 141 is released from the gear 185, and the main shaft 140 ceases to rotate. Accordingly, since the stopper ball 196 is engaged with the recess formed in the housing 102, the gear 141 of the main shaft 140 is stopped at the initial position.

Therefore, when the main shaft is rotated directly by the gear 185 of the rotating mechanism through one revolution, the pistons 162, 163, 164 are moved up and down so that a regeneration of the ion exchange resin is conducted, as described later. The movement of the pistons 162, 163, 164 is controlled by the engagement thereof with the end portions of the arm members 152, 153, 154 and the groove cams 142, 143, 144. Namely, the rotation of the main shaft 140 is converted to the up and down movement of the pistons 162, 163, 164 by the groove cams.

The time at which the regeneration of the ion exchange resin of the water softening unit is to be carried out is determined by the position of the finger member 121. Namely, in this embodiment, as six finger members 121 are provided to the skipper wheel 120 at a constant interval therebetween, and the day-wheel 110 is fully rotated once a day, the regeneration can be carried out six times a day if all the finger members 121 are set in the first position whereat the ridges 128 engage the ratchet pole 131.

When the regeneration is carried out by a manual operation at an arbitrary time, the timer knob 130 is rotated in a predetermined direction through a predetermined angle by hand, so that the gear 141 of the main shaft 140 is engaged with the idler gear 185 to conduct the regenerating operation. Since the engaging portion 186 between the idler gear 185 and the drive gear 181 is a ratchet mechanism, the timer knob 130 can be rotated in either direction by hand. That is, while the regenerating operation is being carried out, the timer knob 130 can be rotated from an arbitrary position to an initial position so that the regenerating operation can be stopped before completion of the full process.

If the present time indicated by the day-wheel 110 is to be changed, or the time set for the regenerating operation is to be changed, the projection pin 175 is pressed down against the spring 184 so that the pinion gear 171 is released from the day-wheel 110, and thus the day-wheel 110 can be rotated to change the above times.

As described above, according to the embodiment of the present invention, since the day-wheel 110 and the skipper wheel 120 are disposed coaxially to each other, the time control device is compact, and the skipper wheel 120 can be designed in an appropriate size, so that the finger member 121 can be designed to have a proper size and shape for easy handling. Further, since one end portions of the arm members 152, 153, 154 engage with the groove cams 142, 143, 144 formed on the main shaft 140, and the other end portions of the arm members 152, 153, 154 engage with the pistons 162, 163, 164, a rotative movement of the main shaft 140 is converted to an up and down movement of the pistons 162, 163, 164. Accordingly, the size of the time control device can be made smaller than that of the construction in which the day-wheel 110 and the skipper wheel 120 are coaxially disposed. Further, since the movements of the pistons 162, 163, 164 are set by forming the groove cams 142, 143, 144 in an appropriate shape, the setting and a control of a regeneration operation of the water softening unit is very easy. Still further, according to this embodiment, a manually operated regeneration can be freely carried out, and the indicated time and the set time for the regeneration can be easily changed.

The construction for a regeneration of the ion exchange resin and the operation thereof are described below with reference to FIGS. 15 through 19, which show the treatment container 200 and the valve mechanism 300 connected to the housing 101.

Figure 15:
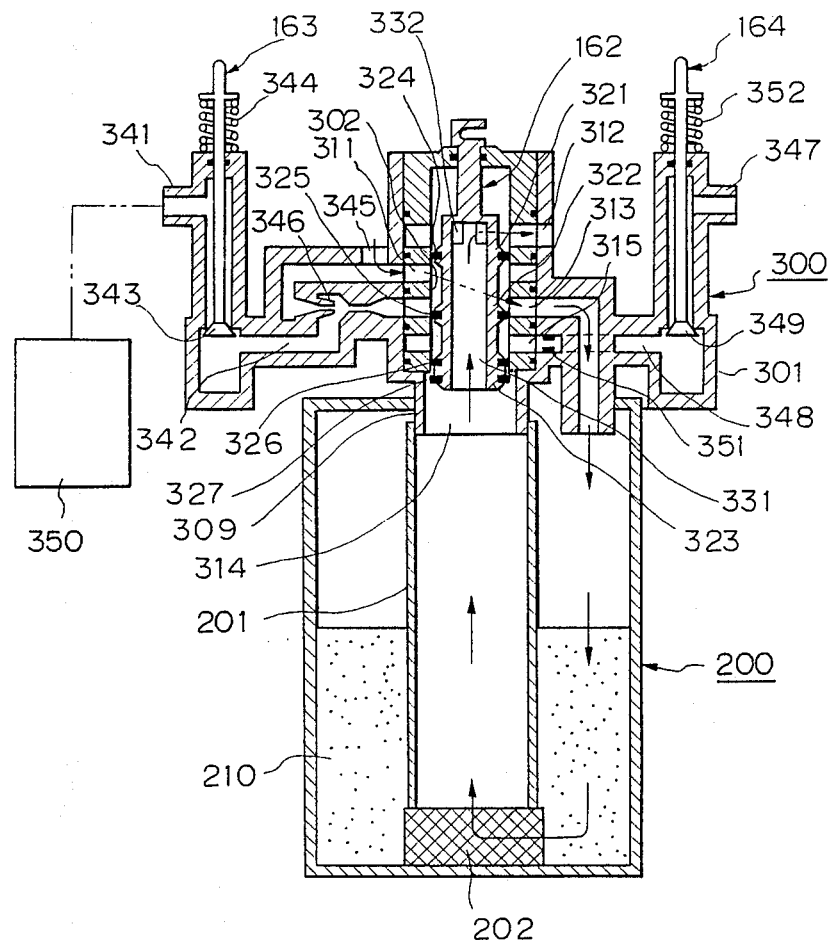
FIG. 15 is a sectional view of a valve mechanism when a treatment operation is carried out.

In FIG. 15, a valve housing 301 fixed to a lower portion of the housing 101 (FIGS. 1 through 7) is connected to the treatment container 200. A tube member 201 is housed in the treatment container 200 to extend along the axis to a point close to the bottom of the container 200. A filter 202 is fixed to the lower end of the tube member 201 to prevent the ion exchange resin 210 from flowing out of the container 200, and the upper end of the tube member 201 is connected to a second connecting port 314 formed in the valve housing 301. An ion exchange resin 210 is held in the treatment container 200 to reduce or remove a hardness of the hard water.

Figure 5:
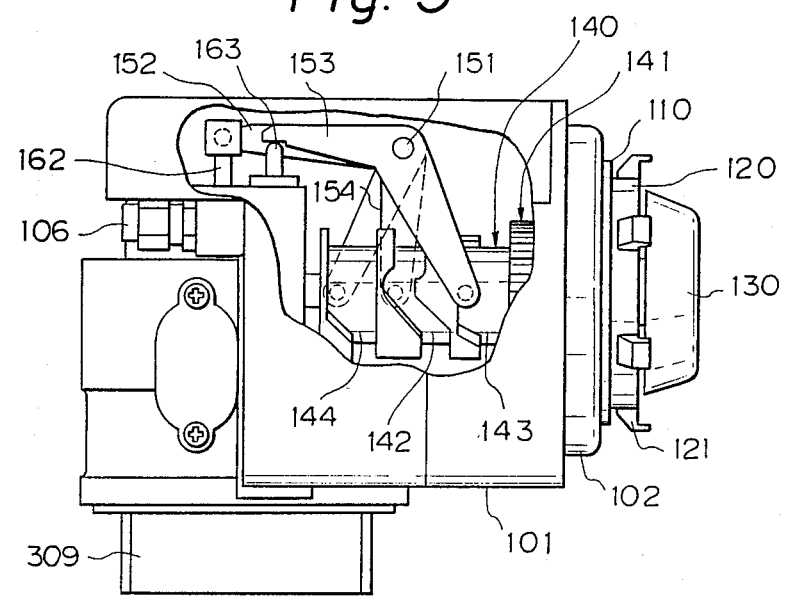
FIG. 5 is a side view of the time control device showing a regeneration control mechanism.
Figure 6:
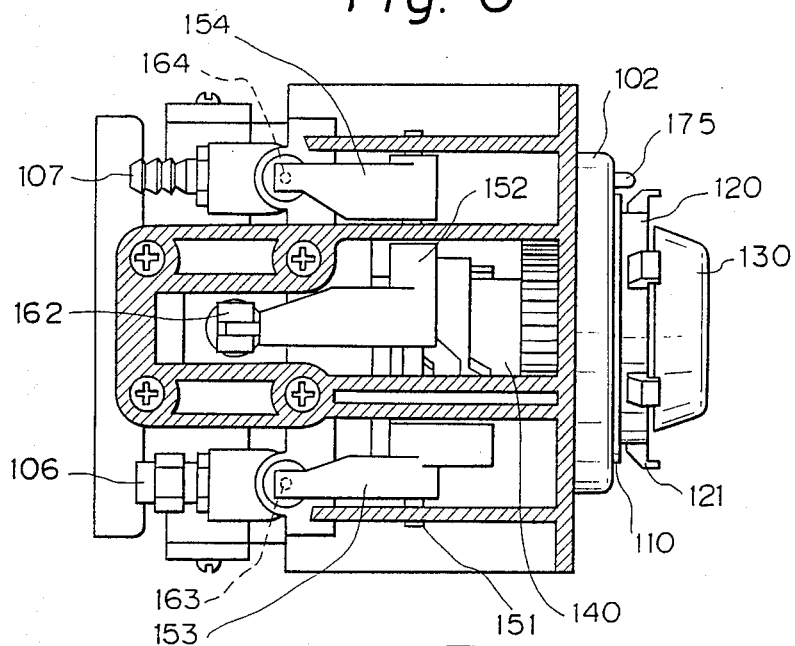
FIG. 6 is a sectional view of the time control device.
Figure 7:
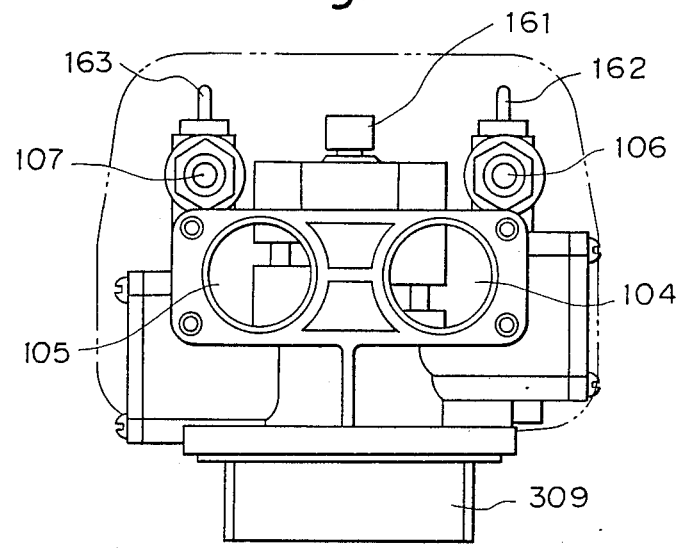
FIG. 7 is a back side view of the time control device.
Figure 8:
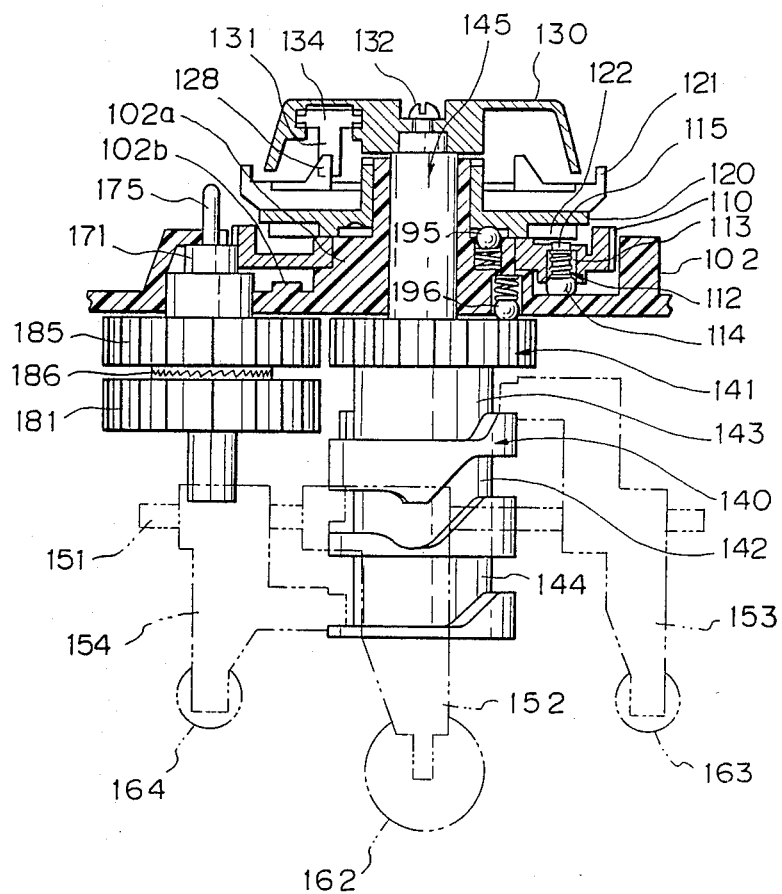
FIG. 8 is a sectional view of a main part of the time control device.

The valve housing 101 has a bore 302 formed in the housing 301 and extending along the axis of the treatment container 200. A main piston 162 is slidably supported in the bore 302, and connected to the arm member 152, as shown in FIG. 5. The housing 301 is formed with an inlet port 311, an outlet port 312, a first connecting port 313, a second connecting port 314, and a drain discharging port 315. The inlet port 311 is provided for introducing hard water into the treatment container 200, wherein the hard water is softened by the ion exchange resin 210, and the soft water is discharged from the outlet port 312. The first and second connecting ports 313, 314 communicate with the treatment container 200, respectively. The drain discharge port 315 is provided for discharging hard water and brine outside the water softening unit. The bore 302 is connected to the inlet port 311, the outlet port 312, the first connecting port 313, the second connecting port 314, and the drain discharge port 315. The main piston 162 slidably moves in the bore 302 to open and close the ports 311, 312, 313, 314, 315.

The outlet port 312, the inlet port 311, the first connecting port 313, the drain discharging port 315, and the second connecting port 314 are located from the top side of the housing 301 to the bottom side of the housing 301, in that sequence. The main piston 162 moves from a lower position to an upper position so that the regeneration operation is carried out, as described later.

The piston 162 has three annular ribs 321, 322, 323 and annular seal members 324, 325, 326, 327. The first seal member 324 is fitted on the rib 321 provided at the top position; the second seal member 325 is fitted on the rib 322 provided at the middle position; and the third and fourth seal members 326, 327 are fitted on the rib 323 provided at the lower position. The seal members 324, 325, 326, 327 are in slidable contact with the inner wall of the bore 302 in a fluid-tight manner. The first seal member 324 is in contact with the upper and lower portions of the outlet port 312; the second seal member 325 is in contact with the upper and lower portions of the first connecting port 313; and the third seal member 326 is in contact with the upper and lower portions of the drain discharge port 315.

The piston 162 is formed with a hole 331 extending along the axis of the piston 162, which hole 331 is open at the lower end portion thereof to communicate with the second connecting port 314, and communicates with outside of the piston 162 through an opening 332 formed at an upper portion of the piston 162.

The valve housing 301 is provided with a brine port 341 connected to a brine tank 350 reserving brine for regenerating the ion exchanging resin 210. A brine passage 342 connecting the brine port 341 to the bore 302 is open and closed by a brine valve 343 formed on the lower portion of the piston 163. The piston 163 is supported by the housing 301, and projects from the housing 301, and a spring 344 is provided outside the housing 301 to urge the piston 163 to close the valve 343. As described above, the piston 163 is moved according to a rotation of the groove cam 143 so that the valve 343 opens and closes the passage 342.

A water pipe connecting mouth 345 is formed in the housing 301 to introduce hard water into the treatment container 200 for softening. The connecting mouth 345 communicates with the inlet port 311 and with the brine passage 342, and an injector or restriction 346 is formed in the brine passage 342 connecting to the connecting mouth 345.

A drain pipe connecting mouth 347 is formed in the housing 301 to discharge brine and hard water outside the water softening unit when the ion exchange resin 210 is regenerated or the housing and the container 200 are rinsed. The connecting mouth 347 communicates with the discharge port 315. A discharge passage 348 connecting the discharge port 315 to the drain pipe connecting mouth 347 is open and closed by a drain valve 349 formed on the lower end portion of the piston 164, and a spring 352 is provided outside the housing 301 to urge the piston 164 to close the valve 349. As described above, the piston 164 is moved according to a rotation of the groove cam 144 so that the valve 349 opens and closes the passage 348. A restriction 351 is formed in the passage 348, between the discharge port 315 and the valve 349.

The first connecting port 313 is communicated with the treatment container 200 through a first passage 352 formed in the housing 301, and the second connecting port 314 is communicated with the treatment container 200 through the tube member 201.

In the water softening unit, a treatment cycle, a back wash cycle, a brine regenerating cycle, a rapid rinsing cycle, and a water supply cycle are carried out, in sequence, and these cycles are controlled by the time control device 100.

FIG. 15 shows the treatment cycle wherein the valves 343, 349 are closed and the main piston 162 is positioned at the lowest position, so that the first seal member 324 is located between the inlet port 311 and the outlet port 312, the second seal member 325 is located between the first connecting port 313 and the discharge port 315, and the third and fourth seal members 326, 327 are located below the discharge port 315, and therefore, the inlet port 311 is communicated with the first connecting port 313, i.e., the treatment container 200. The outlet port 312 is communicated with the treatment container 200 through the tube member 201, the second connecting port 314, and the opening 324.

Accordingly, hard water supplied from the water pipe connecting mouth 345 flows through the inlet port 311, the first connecting port 313, the treatment container 200, the ion·exchange resin 210, the tube member 201, the second connecting port 309, the hole 331, the opening 332, and the outlet port 312, in sequence, and when the hard water passes through the ion exchange resin 210, an ion exchange of the water is carried out so that the water is softened. The soft water is discharged from the outlet port 312 and supplied to an external device.

After a long term treatment, the ion exchange capability of the ion exchange resin 210 is lowered, and therefore, a regenerating operation for recovering the ion exchange ability of the ion exchange resin 210 must be carried out.

Figure 16:
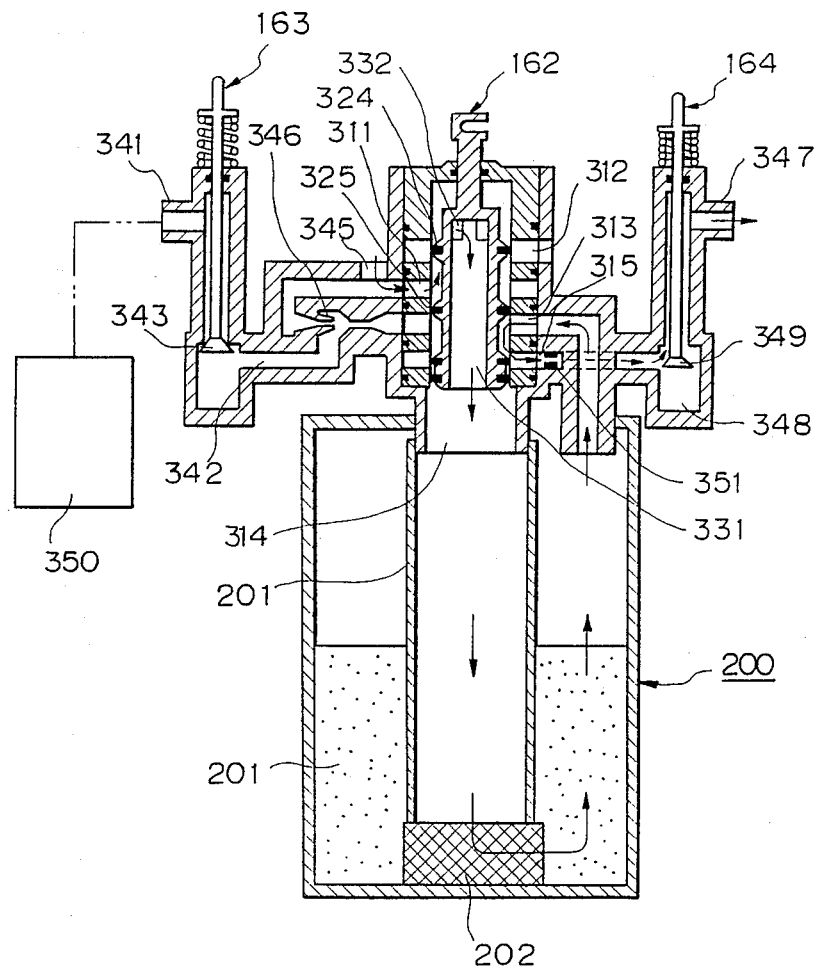
FIG. 16 is a sectional view of the valve mechanism when a reverse rinsing operation is carried out.

At the first step of the regenerating operation, a back wash cycle is carried out, as shown in FIG. 16. In this cycle, the brine valve 434 closes the passage 342, and the drain valve 348 opens the discharge passage 348. The main piston 12 is positioned at a higher position than in the treatment cycle, so that the first seal member 324 faces the outlet port 312, the second seal member 325 is located between the inlet port 311 and the first connecting port 313, the third seal member 326 faces the discharge port 315, and the fourth seal member 327 is located below the discharge port 315. Therefore, the inlet port 311 is communicated with the opening 332, i.e., the treatment container 200. The treatment container 200 is communicated with the discharge port 315 through the first connecting port 313.

Accordingly, hard water supplied from the brine tank connecting mouth 345 flows through the inlet port 311, the opening 332, the hole 331, the tube member 201, the second connecting port 314, the ion exchange resin 210, the first connecting port 313, the discharge port 315, and the drain pipe connecting mouth 347, in sequence, and when the hard water passes through the ion exchange resin 210 from the lower side to the upper side thereof, the ion exchange resin 210 is loosened to be expanded, and thus the regenerating operation is effectively carried out. Note that, since the regeneration cycle is usually carried out while the device to which softened water is supplied is stopped, the water does not flow out through the outlet port 312.

Figure 17:
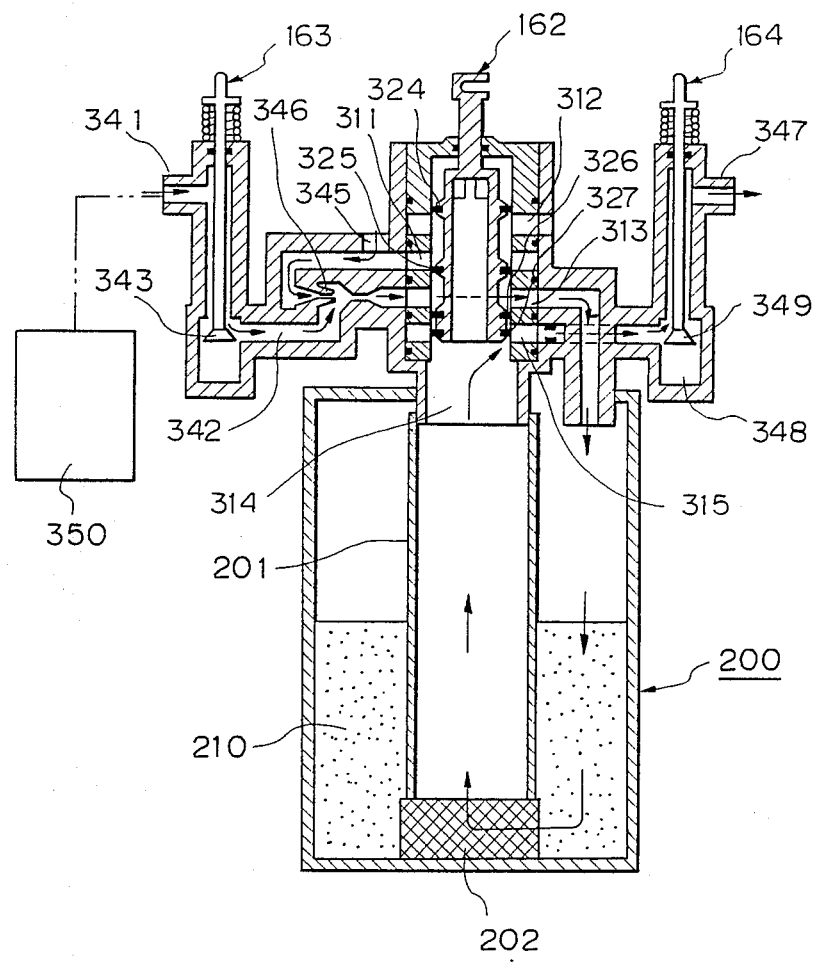
FIG. 17 is a sectional view of the valve mechanism when a regenerating operation is carried out.

When the regeneration cycle is carried out, as shown in FIG. 17, the brine valve 343 opens the passage 342, and the drain valve 348 opens the discharge passage 348. The main piston 162 is positioned at a higher position than in the back wash cycle, so that the first seal member 324 is in contact with the upper portion of the outlet port 312, the second seal member 325 is in contact with the lower portion of the inlet port 311, the third seal member 326 is in contact with the portion between the first connecting port 313 and the discharge port 315, and the fourth seal member 327 faces the discharge port 315. Therefore, the brine tank connecting mouth 345 is communicated with the first connecting port 313 through the restriction 346 and the passage 342, to communicate with the treatment container 200. The treatment container 200 is communicated with the discharge port 315 through the tube member 201.

Accordingly, hard water supplied from the water pipe connecting mouth 345 flows through the restriction 346 and the first connecting port 313, and then flows into the treatment container 200. When the hard water passes through the restriction 346, brine supplied from the brine tank 350 is sucked into the first connecting port 313 due to the effect of the restriction 346, so that a mixture of hard water and brine flows into the treatment container 200 through the first connecting port 313. While this mixture of water and brine flows through the ion exchange resin 210, the ion exchange resin 210 is regenerated by ions in the brine, so that the ion exchange ability of the resin 210 is recovered. The mixed water and brine flows through the tube member 201, the second connecting port 314, and the discharge port 315, in sequence, to be discharged externally through the discharge pipe connecting mouth 347.

As described above, for the back wash cycle, since the ion exchange resin 210 is loosened and expanded, the ion exchange resin 210 and the brine are in full contact with each other, whereby an effective regeneration can be performed.

Figure 18:
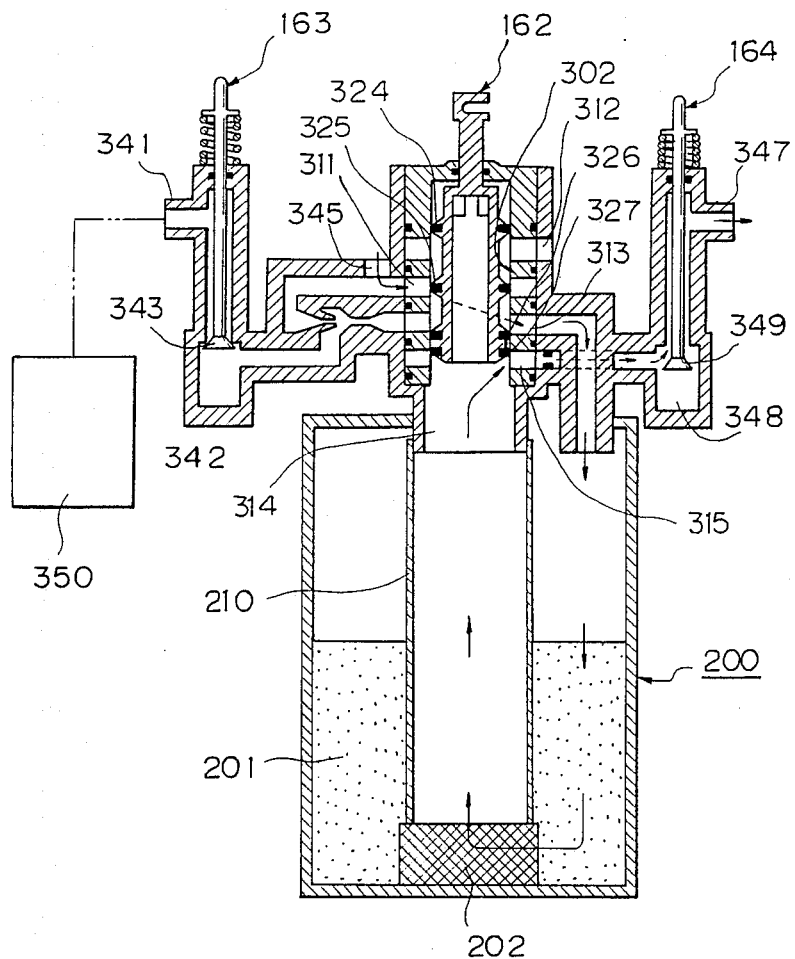
FIG. 18 is a sectional view of the valve mechanism when a rapid rinsing operation is carried out.

After the regeneration cycle, a rapid rinsing cycle is carried out to discharge brine remaining in the treatment container 200. In the rapid rinsing cycle, as shown in FIG. 18, the brine valve 343 closes the passage 342, and the drain discharge valve 349 opens the discharge passage 348. The main piston 162 is positioned at a higher position than in the back wash cycle, i.e., at the uppermost position, so that the first seal member 324 is in contact with the upper portion of the outlet port 312, and the second seal member 325 faces the inlet port 311, and the third and fourth seal members 326, 327 are in contact with the portion between the first connecting port 313 and the discharge port 315. Therefore, the water pipe connecting mouth 345 is communicated with the first connecting port 313 through the bore 302 to be connected to the treatment container 200. The treatment container 200 is communicated with the discharge port 315 through the tube member 201.

Accordingly, hard water supplied from the water pipe connecting mouth 345 flows through the first connecting port 313 into the treatment container 200, flows through the tube member 210 and the discharge port 315, and is discharged from the drain pipe connecting mouth 347. In this rinsing cycle, the water flows through the ion exchange resin 201 from the upper portion to the lower portion. Since brine having a specific gravity higher than hard water is reserved in the bottom portion of the treatment container 200, due to a flow of hard water from the upper portion to the lower portion in the treatment container 200, the hard water pushes out the brine contained in the ion exchange resin 201, so that the brine is discharged from the ion exchange resin 201 through the tube member 210.

Figure 19:
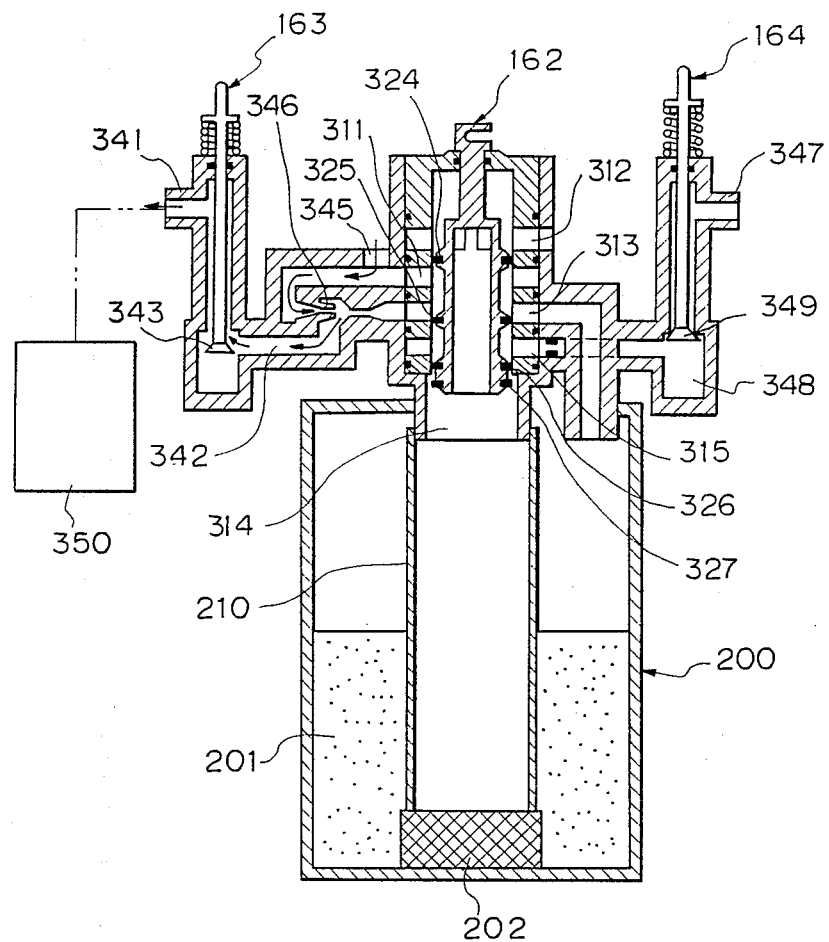
FIG. 19 is a sectional view of the valve mechanism when a water supply operation is carried out.

After the rapid rinsing cycle, as shown in FIG. 19, the main piston 162 moves to the lowest position, which is the same as that of the treatment cycle, so that a water supply cycle is started. Namely, the open and closed condition of the ports 311 through 315 is the same as in the treatment cycle. Further, the brine valve 343 opens the passage 342, and the drain valve 348 closes the discharge passage 348.

In the water supply cycle, hard water supplied from the water pipe connecting mouth 345 flows through the restriction 346 and the passage 342 and into the brine tank 350, so that the quantity of water in the brine tank 350 is replenished. When a predetermined volume of water is supplied to the brine tank 350, the brine valve 343 is closed to complete the water supply cycle.

After the regeneration operation is carried out as described above, the water softening unit returns to the condition shown in FIG. 15 so that the treatment cycle in which hard water is softened is carried out.

Figure 20:
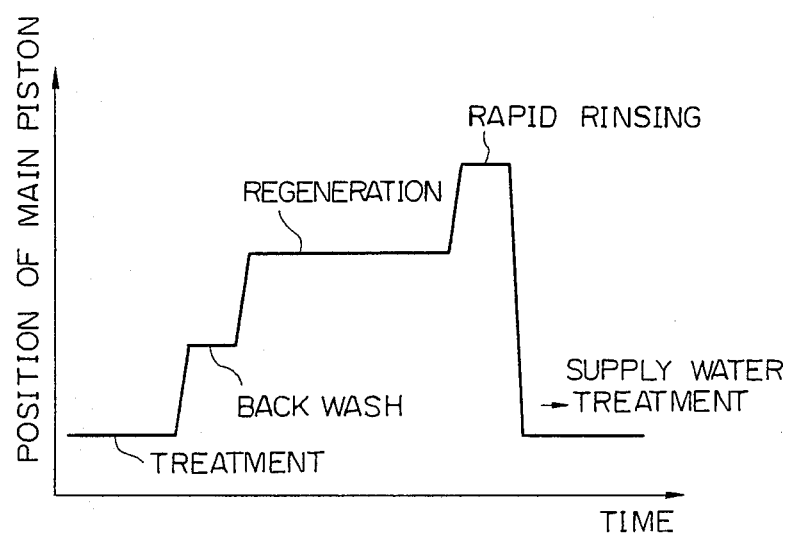
FIG. 20 is a graph showing a position of a main piston of the valve mechanism.

FIG. 20 shows a movement of the main piston 162 for the treatment operation and the regenerating operation. As understood from the drawing, the back wash cycle, the regenerating cycle, and the rapid rinsing cycle are carried out while the main piston 162 moves in a forward direction. When moved in a backward direction, the main piston 162 returns to the initial position and does not work, and therefore, in the rapid rinsing cycle, the water for rinsing out the unit flows through the ion exchange resin 201 from the upper side to the lower side, so that a better rinsing is attained in comparison with a conventional device.

While embodiments of the present invention have been described herein with reference to the attached drawings, many modifications and changes may be made by those skilled in this art without departing from the scope of the invention.

We claim:

1. A time control device for a water conditioning apparatus, said time control device periodically changing flow conditions of a liquid in said apparatus, said time control device comprising:

a housing connected to a treatment container, means for controlling a flow of said liquid in said water conditioning apparatus, wherein said control means has a bore formed in said housing and a main piston slidably supported in said bore, said housing being formed with an inlet port for introducing said liquid into said treatment container, an outlet port for discharging treated liquid, a first connecting port communicating with said treatment container, a second connecting port communicating with said treatment container, and a drain discharge port for discharging treated liquid outside said water conditioning apparatus, said bore being connected to said inlet port, said outlet port, said first connecting port, said second connecting port, and said discharge port, said piston moving in said bore to open and close said each port, wherein said outlet port, said inlet port, said first connecting port, said drain discharge port, and said second connecting port are located from the top side of said housing to the bottom side of said housing, and said piston moves in a predetermined direction so that the regeneration operation is carried out, a main shaft rotatably supported by said housing, said main shaft having a mechanism for driving said control means in accordance with a rotation of said main shaft, a main wheel rotatably supported about the axis of said main shaft, means for rotating said main shaft and said main wheel, said rotating means constantly rotating said main wheel at a predetermined speed, and rotating said main shaft to perform a treatment, a skipper wheel rotatably supported about the axis of said main shaft, means for engaging said main wheel with said skipper wheel to rotate said skipper wheel through a predetermined angle, means for transmitting said predetermined angular rotation of said skipper wheel to said main shaft, so that said main shaft is rotated directly by said rotating means, whereby a treatment by and of said liquid is carried out.

2. A time control device according to claim 1, wherein liquid for rinsing out said water conditioning apparatus flows from the upper side to the lower side of said apparatus.

3. A time control device for a water conditioning apparatus, said time control device periodically changing flow conditions of a liquid in said apparatus, said time control device comprising;

a housing connected to a treatment container, means for controlling a flow of said liquid in said water conditioning apparatus, wherein said control means has a bore formed in said housing and a main piston slidably supported in said bore, said housing being formed with an inlet port for introducing said liquid into said treatment container, an outlet port for discharging treated liquid, a first connecting port communicating with said treatment container, a second connecting port communicating with said treatment container, and a drain discharge port for discharging treated liquid outside said water conditioning apparatus, said bore being connected to said inlet port, said outlet port, said first connecting port, said second connecting port, and said discharge port, said piston moving in said bore to open and close said each port, and wherein said piston is provided with annular ribs having seal members fitted on said annular ribs to realize a fluid-tight contact thereon with said bore;

a main shaft rotatably supported by said housing, said main shaft having a mechanism for driving said control means in accordance with a rotation of said main shaft, a main wheel rotatably supported about the axis of said main shaft, means for rotating said main shaft and said main wheel, said rotating means constantly rotating said main wheel at a predetermined speed, and rotating said main shaft to perform a treatment, a skipper wheel rotatably supported about the axis of said main shaft, means for engaging said main wheel with said skipper wheel to rotate said skipper wheel through a predetermined angle, means for transmitting said predetermined angular rotation of said skipper wheel to said main shaft, so that said main shaft is rotated directly by said rotating means, whereby a treatment by and of said liquid is carried out.

4. A time control device according to claim 1, wherein, in a treatment cycle, said main piston is positioned at the lowest position, so that said liquid flows through said inlet port, said first connecting port, said treatment container, said second connecting port, and said outlet port, in that sequence.

5. A time control device according to claim 1, wherein, in a back wash cycle, said main piston is positioned at a higher position than in said treatment cycle, so that liquid flows through said inlet port, said second connecting port, said treatment container, said first connecting port, and said discharge port, in that sequence.

6. A time control device according to claim 1, wherein, in a regeneration cycle, said main piston is positioned at a higher position than in said back wash cycle, so that said liquid flows into said housing, and said liquid flows through said first connecting port, said treatment container, said second connecting port, and said discharge port, in that sequence.

7. A time control device according to claim 1, wherein, in a rapid rinsing cycle, said main piston is positioned at an uppermost position thereof, so that said liquid flows through said inlet port, said first connecting port, said treatment container, said second connecting port, and said drain discharge port, in that sequence.

8. A time control device for a water conditioning apparatus, said time control device periodically changing flow conditions of a liquid in said apparatus, said time control device comprising;
a housing connected to a treatment container,
means for controlling a flow of said liquid in said water conditioning apparatus,
a main shaft rotatably supported by said housing, said main shaft having a mechanism for driving said control means in accordance with a rotation of said main shaft, wherein said driving mechanism has at least one groove cam formed on an outer surface of said shaft, and at least one arm member engaging with said groove cam for driving said control means,
a main wheel rotatably supported about the axis of said main shaft,
means for rotating said main shaft and said main wheel, said rotating means constantly rotating said main wheel at a predetermined speed, and rotating said main shaft to perform a treatment,
a skipper wheel rotatably supported about the axis of said main shaft,
means for engaging said main wheel with said skipper wheel through a predetermined angle,
means for transmitting said predetermined angular rotation of said skipper wheel to said main shaft, so that said main shaft is rotated directly by said rotating means, whereby a treatment by and of said liquid is carried out.

9. A time control device for a water conditioning apparatus, said time control device periodically changing flow conditions of a liquid in said apparatus, said time control device comprising;
a housing connected to a treatment container,
means for controlling a flow of said liquid in said water conditioning apparatus,
a main shaft rotatably supported by said housing, said main shaft having a mechanism for driving said control means in accordance with a rotation of said main shaft,
a main wheel rotatably supported about the axis of said main shaft,
means for rotating said main shaft and said main wheel, said rotating means constantly rotating said main wheel at a predetermined speed, and rotating said main shaft to perform a treatment, wherein said rotating means has a motor, a reduction gear train for reducing a rotation speed of said motor, a drive gear mechanism for rotating said main shaft, and a pinion gear for rotating said main wheel,
a skipper wheel rotatably supported about the axis of said main shaft,
means for engaging said main wheel with said skipper wheel through a predetermined angle,
means for transmitting said predetermined angular rotation of said skipper wheel to said main shaft, so that said main shaft is rotated directly by said rotating means, whereby a treatment by and of said liquid is carried out.

10. A time control device according to claim 9, wherein said main wheel is provided with a gear on an outer surface thereof, said gear meshing with said pinion gear.

11. A time control device according to claim 9, wherein said main shaft is provided with a gear on an outer surface thereof, said gear meshing with said drive gear mechanism.

12. A time control device according to claim 11, wherein said gear of main shaft has a notch portion which does not mesh with said drive gear mechanism, so that a rotation of said rotating means is not transmitted to said main shaft except for the regenerating operation.

13. A time control device according to claim 12, wherein said transmitting means rotates said main shaft through said predetermined angle, so that said gear of said main shaft meshes with said drive gear mechanism to rotate said main shaft.

14. A time control device, for a water conditioning apparatus, said time control device periodically changing flow conditions of a liquid in said apparatus, said time control device comprising;
a housing connected to a treatment container,
means for controlling a flow of said liquid in said water conditioning apparatus,
a main shaft rotatably supported by said housing, said main shaft having a mechanism for ribing said control means in accordance with a rotation of said main shaft,
a main wheel rotatably supported about the axis of said main shaft,
means for rotating said main shaft and said main wheel, said rotating means constantly rotating said main wheel at a predetermined speed, and rotating said main shaft to perform a treatment,
a skipper wheel rotatably supported about the axis of said main shaft,
means for engaging said main wheel with said skipper wheel through a predetermined angle, wherein said engaging means has a projection cam formed on said housing and extending along a direction of rotation of said main wheel, a pin supported by said main wheel extending through said main wheel in parallel with the axis thereof, and ribs formed on said skipper wheel, one end portion of said pin engaging with said projection cam so that said pin moves in parallel with the axis of said main wheel, whereby the other end of said pin is engaged with one of said ribs to rotate said skipper wheel through a predetermined angle, means for transmitting said predetermined angular rotation of said skipper wheel to said main shaft, so that said main shaft is rotated directly by said rotating means, whereby a treatment by and of said liquid is carried out.

15. A time control device for a water conditioning apparatus, said time control device periodically changing flow conditions of a liquid in said apparatus, said time control device comprising;

a housing connected to a treatment container, means for controlling a flow of said liquid in said water conditioning apparatus, a main shaft rotatably supported by said housing, said main shaft having a mechanism for ribing said control means in accordance with a rotation of said main shaft, a main wheel rotatably supported about the axis of said main shaft, means for rotating said main shaft and said main wheel, said rotating means constantly rotating said main wheel at a predetermined speed, and rotating said main shaft to perform a treatment, a skipper wheel rotatably supported about the axis of said main shaft, means for engaging said main wheel with said skipper wheel through a predetermined angle, means for transmitting said predetermined angular rotation of said skipper wheel to said main shaft, so that said main shaft is rotated directly by said rotating means, whereby a treatment by and of said liquid is carried out. wherein said transmitting means has a timer knob fixed on the end portion of said main shaft, a ratchet pole provided on said timer knob, and finger members provided on said skipper wheel, each of said finger members having a projection portion engagable with said ratchet pole to rotate said main shaft through said timer knob.

16. A time control device according to claim 15, wherein said finger members are displacable radially along said skipper wheel so that said projection portions can engage with said ratchet pole when said finger members are located at a first position, and can not engage with said ratchet pole when said finger members are located at a second position.

17. A time control device according to claim 15, wherein said ratchet pole is pivotably supported by said timer knob, and said timer knob has a stopper with which said ratchet pole is engaged when said finger members engage said ratchet pole, so that said ratchet pole is prevented from pivoting to transmit a rotation of said skipper wheel to said main shaft.

18. A time control device according to claim 17, wherein said timer knob is provided with a spring pulling said ratchet pole toward said stopper.

* * * * *